United States Patent
Park et al.

(10) Patent No.: US 10,974,805 B2
(45) Date of Patent: Apr. 13, 2021

(54) BALLAST WATER TREATMENT DEVICE HAVING DEVICE FOR INJECTING BROMINE SALT AND OZONE

(71) Applicant: NK CO., LTD., Busan (KR)

(72) Inventors: Sung Jin Park, Busan (KR); Seung Je Yoon, Busan (KR); Dong Yeon Cho, Busan (KR); Sang Yong Kim, Changwon-si (KR); Tae Hyeon Park, Yangsan-si (KR); In Dong Kim, Gwangyang-si (KR)

(73) Assignee: NK CO., LTD., Busan (KR)

( * ) Notice: Subject to any disclaimer, the term of this patent is extended or adjusted under 35 U.S.C. 154(b) by 345 days.

(21) Appl. No.: 15/543,098

(22) PCT Filed: Nov. 19, 2015

(86) PCT No.: PCT/KR2015/012509
§ 371 (c)(1),
(2) Date: Jul. 12, 2017

(87) PCT Pub. No.: WO2016/093509
PCT Pub. Date: Jun. 16, 2016

(65) Prior Publication Data
US 2017/0341724 A1     Nov. 30, 2017

(30) Foreign Application Priority Data

Dec. 12, 2014   (KR) .................. 10-2014-0179276

(51) Int. Cl.
*B63J 4/00*     (2006.01)
*B63B 13/00*    (2006.01)
(Continued)

(52) U.S. Cl.
CPC .............. *B63J 4/002* (2013.01); *B63B 13/00* (2013.01); *B63J 4/00* (2013.01); *C02F 1/50* (2013.01);
(Continued)

(58) Field of Classification Search
CPC ... B63B 13/00; B63J 4/00; B63J 4/002; C02F 2103/008; C02F 1/50; C02F 1/766; C02F 2303/04
See application file for complete search history.

(56) References Cited

U.S. PATENT DOCUMENTS 6,007,726 A * 12/1999 Yang ................ C02F 1/766
                                              210/752
8,790,518 B2   7/2014 Fischmann Torres
(Continued)

FOREIGN PATENT DOCUMENTS

JP         6-99182 A      4/1994
JP       06099182 A  *   4/1994
(Continued)

OTHER PUBLICATIONS

JPH0699182A—EPO Machine Translation (Year: 2020).*
(Continued)

*Primary Examiner* — Patrick Orme
(74) *Attorney, Agent, or Firm* — Sughrue Mion, PLLC

(57) ABSTRACT

A ballast water treatment apparatus equipped with devices for injecting bromine salt and ozone includes a ballast pipe, a ballast pump, a bromine salt injection part and an ozone processor, wherein the injection part includes a bromine salt storage tank; a bromine salt transfer pipe connected to the ballast pipe for injecting bromine salt supplied from the bromine salt storage tank into the ballast pipe; and a bromine salt injection pump in the transfer pipe for pressurizing bromine salt to be injected into the ballast pipe, and the
(Continued)

ozone processor includes an ozone injection device for supplying ozone to the ballast pipe; a mixer in the ballast pipe for mixing ozone supplied from the ozone injection device and seawater transferred into the ballast pipe; and an ozone transfer pipe connected to the mixer of the ballast pipe for injecting ozone supplied from the ozone injection device into the ballast pipe.

4 Claims, 7 Drawing Sheets

(51) Int. Cl.
- *C02F 1/50* (2006.01)
- *C02F 1/78* (2006.01)
- *C02F 1/76* (2006.01)
- *C02F 103/00* (2006.01)

(52) U.S. Cl.
CPC ............... *C02F 1/766* (2013.01); *C02F 1/78* (2013.01); *C02F 2103/008* (2013.01); *C02F 2201/78* (2013.01); *C02F 2201/784* (2013.01); *C02F 2209/40* (2013.01); *C02F 2303/04* (2013.01)

(56) References Cited

U.S. PATENT DOCUMENTS

| | | | | |
|---|---|---|---|---|
| 2006/0243672 | A1* | 11/2006 | Leeuwen | ............... C02F 1/78 |
| | | | | 210/760 |
| 2009/0127207 | A1* | 5/2009 | Okamoto | ............ B63B 13/00 |
| | | | | 210/747.6 |

FOREIGN PATENT DOCUMENTS

| | | |
|---|---|---|
| KR | 10-0769834 B1 | 10/2007 |
| KR | 10-0775238 B1 | 11/2007 |
| KR | 10-0802889 B1 | 2/2008 |
| KR | 10-2010-017992 A | 2/2010 |
| WO | 2008/153809 A2 | 12/2008 |

OTHER PUBLICATIONS

International Search Report for PCT/KR2015/012509 dated Mar. 2, 2016.

Communication dated Jul. 2, 2018, issued by the European Patent Office in counterpart European Patent Application No. 15867819.3.

* cited by examiner

BALLAST WATER TREATMENT DEVICE HAVING DEVICE FOR INJECTING BROMINE SALT AND OZONE

CROSS-REFERENCE TO RELATED APPLICATION

This application is a National Stage of International Application No. PCT/KR2015/012509 filed Nov. 19, 2015 which claims the priority benefit of Korean Patent Application No. 10-2014-0179276, filed on Dec. 12, 2014 in the Korean Intellectual Property Office, the disclosure of which is incorporated herein by reference.

TECHNICAL FIELD

The present invention relates to a ballast water treatment system, and more particularly, to a method of improving treatment efficiency by adding bromine salt when general water (seawater) or ballast water (fresh water or low salt water) of specific conditions is treated with ozone.

BACKGROUND ART

For a ship whose cargo is unloaded, or when a ship is operated with a very small amount of loaded cargo, ballast tanks formed on both sides of the bottom of the ship are filled with freshwater or seawater for buoyancy adjustment to prevent the ship being unbalanced. The freshwater or seawater used in this case is called ballast water.

Since freshwater or seawater used as ballast water contains various organisms such as pathogens and plankton, discharging ballast water into coastal regions without any treatment may lead to serious marine pollution and destruction of ecosystems.

Based on this situation, in 1996, in the United States, by establishing the national invasive species law, exotic species were defined as invaders and the management and control of ballast water became mandatory. In addition, in Australia, the quarantine law was amended, and ballast water was defined as imported cargo subject to quarantine.

In addition, the International Maritime Organization (IMO) concluded an international agreement in February 2004. According to this agreement, a ship must be equipped with necessary equipment to sterilize ballast water starting in 2009, and in case of violation, the ship is completely prohibited from entering. Accordingly, various techniques for treating ballast water have recently been developed. As a representative example, there is a technology of disinfecting and purifying ballast water using ozone (O3). In this regard, the present inventors also filed patent applications No. 16091, No. 17653 and No. 19305 for ballast water treatment apparatuses in 2007, and were granted corresponding patents (No. 10-769834, No. 10-775238, and No. 10-802889, respectively).

However, in the conventional ballast water treatment apparatus using ozone as described above, because ozone is only stable for a short time, the sterilizing capacity of ozone can be maintained for a short time from the moment when ozone is dissolved, and thereafter, ozone is decomposed. Therefore, there is a disadvantage in that continuous sterilization is difficult when using ozone.

On the other hand, when ozone comes in contact with a trace amount of bromine salt in seawater, hypobromous acid (HBrO) is formed through the following reaction formula.

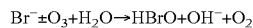

$$Br^- \pm O_3 + H_2O \rightarrow HBrO + OH^- + O_2$$

The generated hypobromous acid remains in seawater, and sterilization action may be continued, but generation of hypobromous acid is poor in the case of seawater containing a low content of bromine salt or low salt water. Therefore, there is a disadvantage in that generation of hypobromous acid, which is responsible for maintaining sterilizing power, is irregular depending on the conditions of seawater.

Therefore, an electrolysis method using chlorine which has a longer residence time than ozone has been developed. However, there is a problem in that a post-treatment process should be carried out with a device for neutralizing chlorine because the chlorine-containing water should not be discharged into the sea.

DISCLOSURE

Technical Problem

The present invention was made to solve the problems of the prior art as described above.

The present invention is directed to providing a ballast water treatment system using ozone, further including bromine salt injection device. When the ballast water treatment system according to the present invention is applied to treat ballast water in bromine salt-deficient areas, bromine salt is supplied to increase the stability of ozone and a reaction product. Thus, the use of such a system may maximize the efficiency of ozone sterilizing organisms in ballast water, and regrowth of the organisms may be suppressed. Therefore, the ballast water treatment system of the present invention may improve problems caused in existing ozone treatment systems by further mounting bromine salt injection device.

Technical Solution

One aspect of the present invention provides a ballast water treatment apparatus equipped with devices for injecting bromine salt and ozone, the ballast water treatment apparatus including a ballast pipe 100 into which seawater flows; a ballast pump 110 for transferring seawater into the ballast pipe 100; bromine salt injection part 3000; and an ozone processor 2000, wherein the bromine salt injection part 3000 includes bromine salt storage tank 300 for storing bromine salt; bromine salt transfer pipe 310, which is connected to the ballast pipe 100, for injecting bromine salt supplied from the bromine salt storage tank 300 into the ballast pipe 100; and bromine salt injection pump 340, which is installed in the bromine salt transfer pipe 310, for pressurizing bromine salt to be injected into the ballast pipe 100, and the ozone processor 2000 includes an ozone injection device 200 for supplying ozone to the ballast pipe 100; a mixer 220, which is installed in the ballast pipe 100, for mixing ozone supplied from the ozone injection device 200 and seawater transferred into the ballast pipe 100; and an ozone transfer pipe 210, which is connected to the mixer 220 of the ballast pipe 100, for injecting ozone supplied from the ozone injection device 200 into the ballast pipe 100.

Another aspect of the present invention provides a ballast water treatment apparatus to which a side-stream portion for bypassing seawater is added. The ballast water treatment apparatus includes a ballast pipe 100 into which seawater flows; a ballast pump 110 for transferring seawater into the ballast pipe 100; a side-stream portion 4000; bromine salt injection part 3000; and an ozone processor 2000, wherein the side-stream portion 4000 includes a side-stream pipe 400, which is branched from the ballast pipe 100, for bypassing a portion of seawater introduced from the ballast pipe 100; a side-stream pump 410, which is installed in the side-stream pipe 400, for transferring a portion of seawater bypassed from the ballast pipe 100 into the side-stream pipe 400; and an injector 420 for injecting the bypassed seawater back into the ballast pipe 100, the bromine salt injection part 3000 includes bromine salt storage tank 300 for storing bromine salt; bromine salt transfer pipe 310, which is connected to the side-stream pipe 400, for injecting bromine salt supplied from the bromine salt storage tank 300 into the side-stream pipe 400; and bromine salt injection pump 340, which is installed in the bromine salt transfer pipe 310, for pressurizing bromine salt to be injected into the side-stream pipe 400, and the ozone processor 2000 includes an ozone injection device 200 for supplying ozone to the side-stream pipe 400; a mixer 220, which is installed in the side-stream pipe 400, for mixing ozone supplied from the ozone injection device 200 and seawater transferred into the side-stream pipe 400; an ozone transfer pipe 210, which is connected to the mixer 220 of the side-stream pipe 400, for injecting ozone supplied from the ozone injection device 200 into the side-stream pipe 400. In each case, the positions of the bromine salt injection part 3000 and the ozone processor 2000 may be determined differently depending on the situation.

Advantageous Effects

A method of generating hypobromous acid responsible for maintaining sterilizing power has been suggested as a method of securing the disadvantages of conventional ozone treatment systems, such as short residence period of ozone. According to the ballast water treatment system of the present invention, by introducing bromine salt injection process in addition to an ozone treatment process, it is possible to sufficiently generate hypobromous acid even in seawater containing a low content of bromine salt or low salt water. Therefore, when the system of the present invention is used, hypobromous acid can be sufficiently generated without being affected by the conditions of water intake area, and consequently sterilization can be continuously preformed in a ballast tank.

MODES OF THE INVENTION

Hereinafter, the present invention is described with reference to the drawings according to embodiments of the present invention, but the embodiments are only for the understanding of the present invention, and the scope of the present invention is not limited thereto.

Example 1: Bromine Salt Injection Location (Ballast Pipe—in Front of Ballast Pump)

Figure 1:
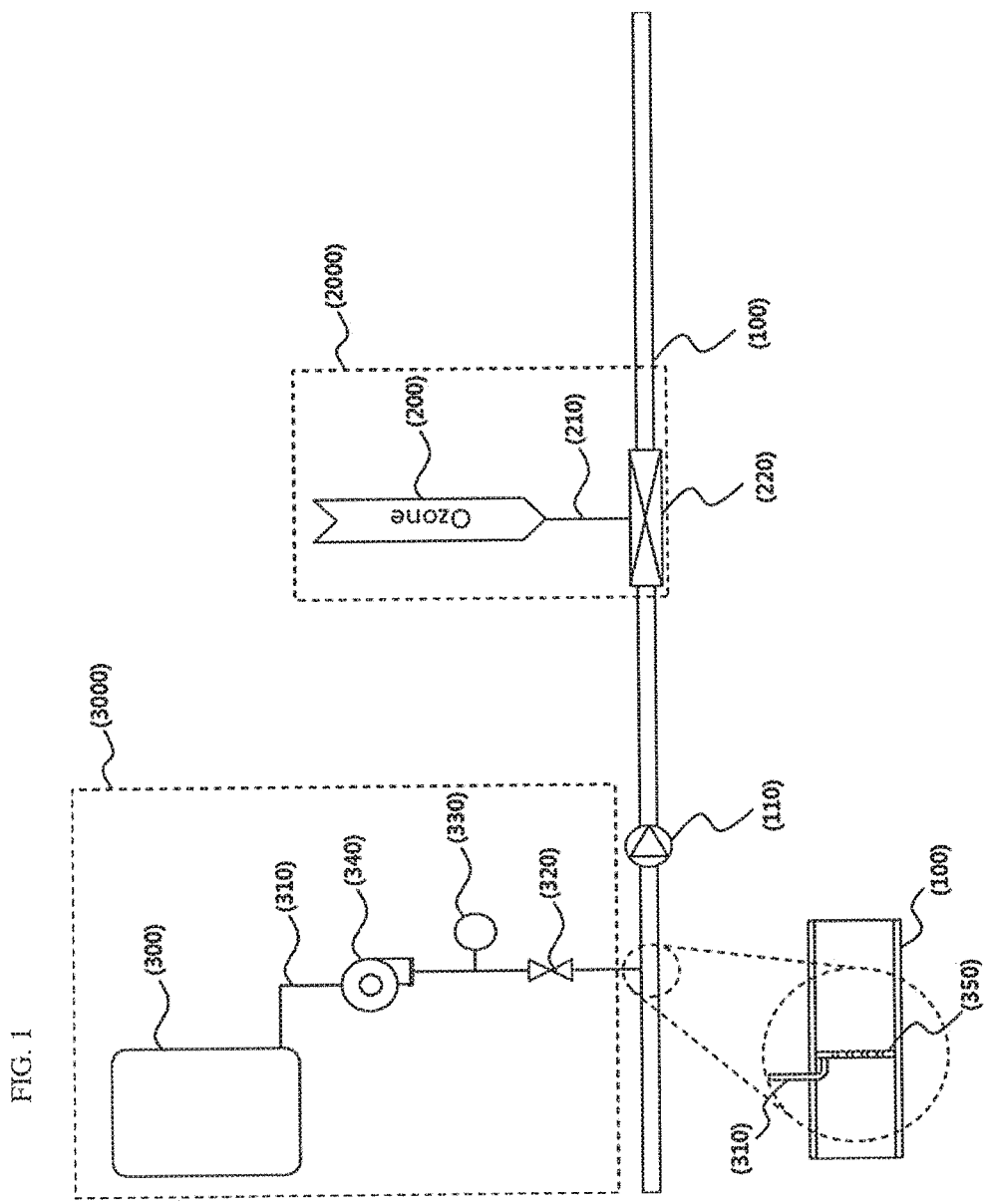
FIG. 1 is a block diagram illustrating a ballast water treatment apparatus equipped with devices for injecting bromine salt and ozone and a diffuser according to an embodiment of the present invention.

Referring to FIG. 1, the ballast water treatment apparatus equipped with devices for injecting bromine salt and ozone according to the present invention includes a ballast pipe 100 into which seawater flows; a ballast pump 110 for transferring seawater into the ballast pipe 100; bromine salt injection part 3000; and an ozone processor 2000, wherein the bromine salt injection part 3000 includes bromine salt storage tank 300 for storing bromine salt; bromine salt transfer pipe 310, which is connected to the ballast pipe 100, for injecting bromine salt supplied from the bromine salt storage tank 300 into the ballast pipe 100; a control valve 320, which is installed in the bromine salt transfer pipe 310, for controlling the amount of bromine salt to be injected; a flow meter 330, which is installed in the bromine salt transfer pipe 310, for measuring the amount of bromine salt to be injected; and bromine salt injection pump 340, which is installed in the bromine salt transfer pipe 310, for pressurizing bromine salt to be injected into the ballast pipe 100, and the ozone processor 2000 includes an ozone injection device 200 for supplying ozone to the ballast pipe 100; a mixer 220, which is installed in the ballast pipe 100, for mixing ozone supplied from the ozone injection device 200 and seawater transferred into the ballast pipe 100; an ozone transfer pipe 210, which is connected to the mixer 220 of the ballast pipe 100, for injecting ozone supplied from the ozone injection device 200 into the ballast pipe 100. The bromine salt transfer pipe 310 is connected to the front region of the ballast pipe 100 with respect to a region where the ballast pump 110 is installed, and is configured to directly inject bromine salt into the ballast pump 110. The ozone processor 2000 is connected to the mixer 220 installed in the ballast pipe 100 and is configured to inject ozone into the mixer 220.

Example 2: Bromine Salt Injection Location (Ballast Pipe—Behind Mixer)

Figure 2:
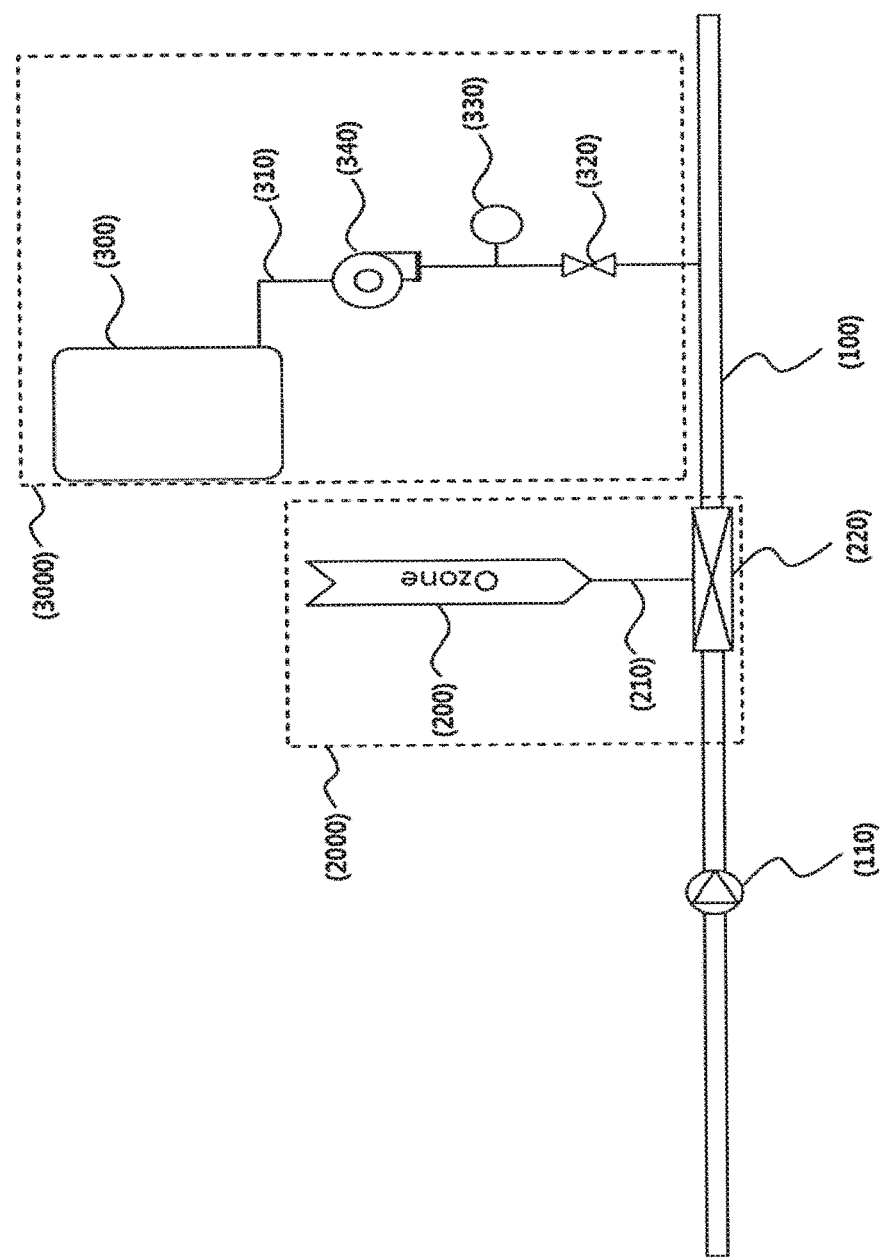
FIG. 2 is a block diagram illustrating a ballast water treatment apparatus equipped with devices for injecting bromine salt and ozone according to another embodiment of the present invention.

Referring to FIG. 2, the ballast water treatment apparatus equipped with devices for injecting bromine salt and ozone according to the present invention includes a ballast pipe 100 into which seawater flows; a ballast pump 110 for transferring seawater into the ballast pipe 100; bromine salt injection part 3000; and an ozone processor 2000, wherein the bromine salt injection part 3000 includes bromine salt storage tank 300 for storing bromine salt; bromine salt transfer pipe 310, which is connected to the ballast pipe 100, for injecting bromine salt supplied from the bromine salt storage tank 300 into the ballast pipe 100; a control valve 320, which is installed in the bromine salt transfer pipe 310, for controlling the amount of bromine salt to be injected; a flow meter 330, which is installed in the bromine salt transfer pipe 310, for measuring the amount of bromine salt to be injected; and bromine salt injection pump 340, which is installed in the bromine salt transfer pipe 310, for pressurizing bromine salt to be injected into the ballast pipe 100, and the ozone processor 2000 includes an ozone injection device 200 for supplying ozone to the ballast pipe 100; a mixer 220, which is installed in the ballast pipe 100, for mixing ozone supplied from the ozone injection device 200 and seawater transferred into the ballast pipe 100; an ozone transfer pipe 210, which is connected to the mixer 220 of the ballast pipe 100, for injecting ozone supplied from the ozone injection device 200 into the ballast pipe 100. The bromine salt transfer pipe 310 is connected to the near region of the ballast pipe 100 with respect to a region where the mixer 220 is installed, and is configured to directly inject bromine salt into the ballast pump 110. The ozone processor 2000 is connected to the mixer 220 installed in the ballast pipe 100 and is configured to inject ozone into the mixer 220.

Example 3: Bromine Salt Injection Location
(Ballast Pipe—Between Ballast Pump and Mixer)

Figure 3:
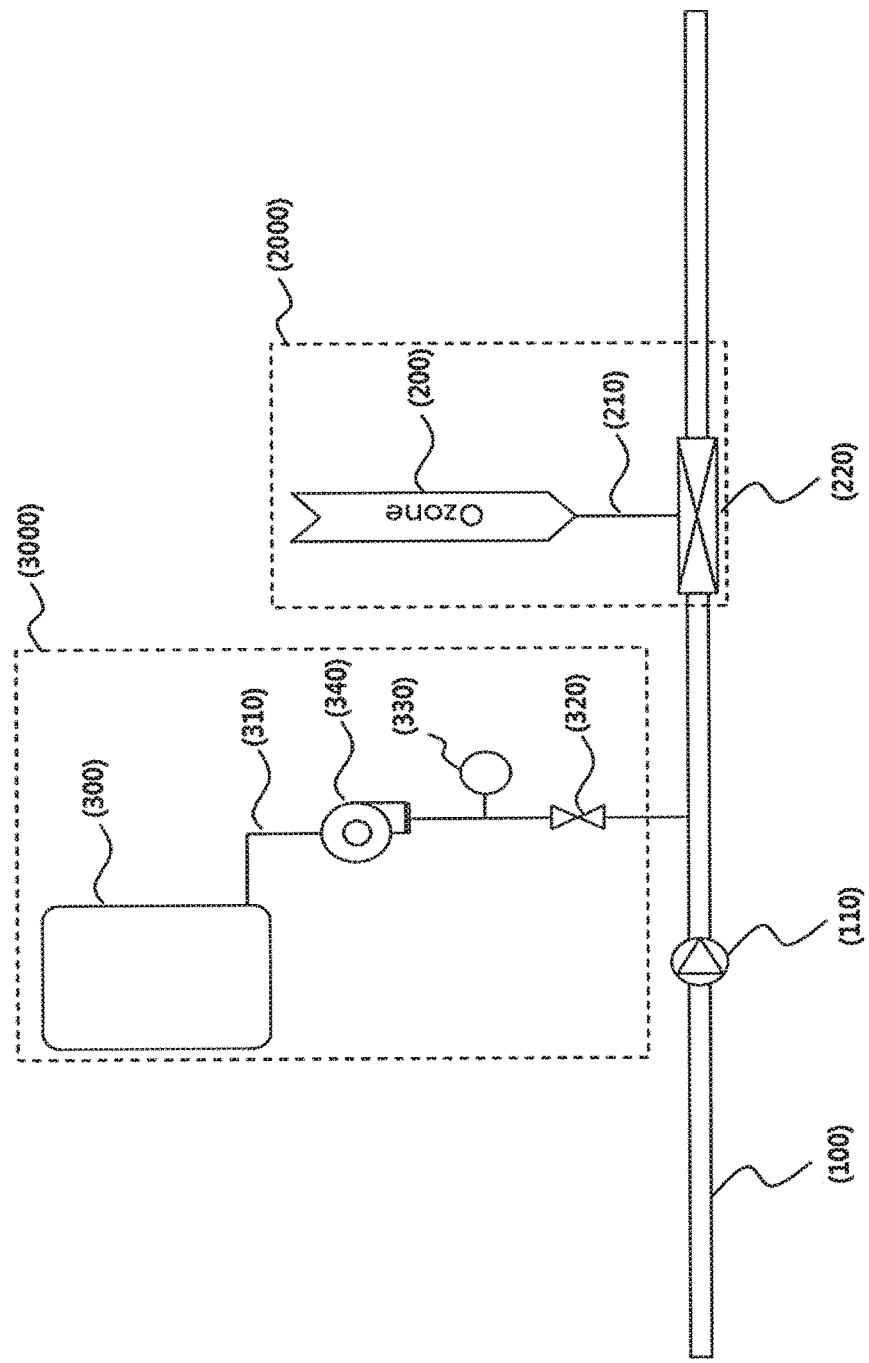
FIG. 3 is a block diagram illustrating a ballast water treatment apparatus equipped with devices for injecting bromine salt and ozone according to still another embodiment of the present invention.

Referring to FIG. 3, the ballast water treatment apparatus equipped with devices for injecting bromine salt and ozone according to the present invention includes a ballast pipe 100 into which seawater flows; a ballast pump 110 for transferring seawater into the ballast pipe 100; bromine salt injection part 3000; and an ozone processor 2000 wherein the bromine salt injection part 3000 includes bromine salt storage tank 300 for storing bromine salt; bromine salt transfer pipe 310, which is connected to the ballast pipe 100, for injecting bromine salt supplied from the bromine salt storage tank 300 into the ballast pipe 100; a control valve 320, which is installed in the bromine salt transfer pipe 310, for controlling the amount of bromine salt to be injected; a flow meter 330, which is installed in the bromine salt transfer pipe 310, for measuring the amount of bromine salt to be injected; and bromine salt injection pump 340, which is installed in the bromine salt transfer pipe 310, for pressurizing bromine salt to be injected into the ballast pipe 100, and the ozone processor 2000 includes an ozone injection device 200 for supplying ozone to the ballast pipe 100; a mixer 220, which is installed in the ballast pipe 100, for mixing ozone supplied from the ozone injection device 200 and seawater transferred into the ballast pipe 100; and an ozone transfer pipe 210, which is connected to the mixer 220 of the ballast pipe 100, for injecting ozone supplied from the ozone injection device 200 into the ballast pipe 100. The bromine salt transfer pipe 310 is connected to the ballast pipe 100 between the ballast pump 110 and the mixer 220, and is configured to directly inject bromine salt into the ballast pump 110. The ozone processor 2000 is connected to the mixer 220 installed in the ballast pipe 100 and is configured to inject ozone into the mixer 220.

Example 4: Bromine Salt Injection Location
(Ballast Pipe—Bromine Salt-Ozone Mixer)

Figure 4:
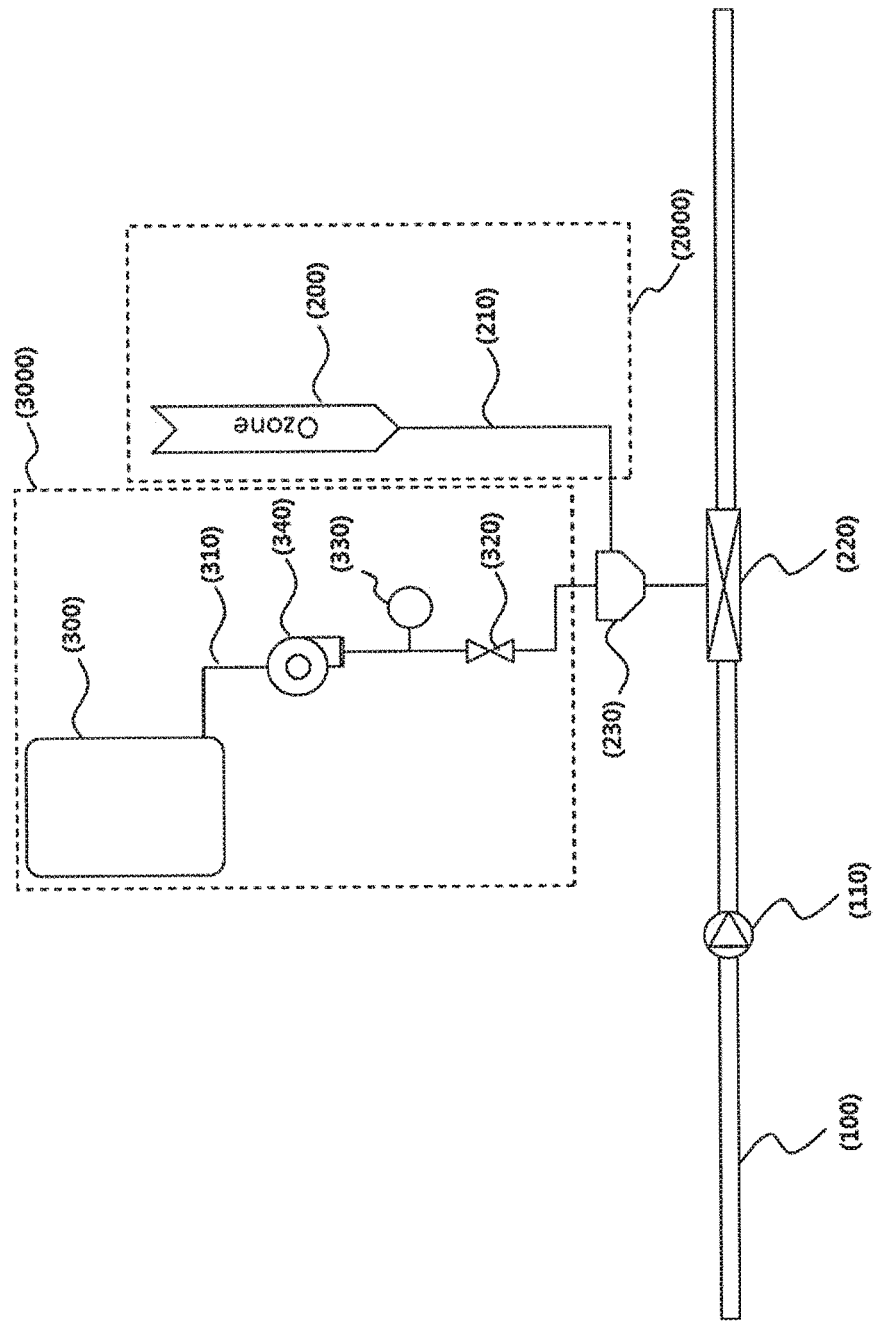
FIG. 4 is a block diagram illustrating a ballast water treatment apparatus equipped with devices for injecting bromine salt and ozone according to yet another embodiment of the present invention.

Referring to FIG. 4, the ballast water treatment apparatus equipped with devices for injecting bromine salt and ozone according to the present invention includes a ballast pipe 100 into which seawater flows; a ballast pump 110 for transferring seawater into the ballast pipe 100; bromine salt injection part 3000; and an ozone processor 2000, wherein the bromine salt injection part 3000 includes bromine salt storage tank 300 for storing bromine salt; bromine salt transfer pipe 310, which is connected to the ballast pipe 100, for injecting bromine salt supplied from the bromine salt storage tank 300 into the ballast pipe 100; a control valve 320, which is installed in the bromine salt transfer pipe 310, for controlling the amount of bromine salt to be injected; a flow meter 330, which is installed in the bromine salt transfer pipe 310, for measuring the amount of bromine salt to be injected; and bromine salt injection pump 340, which is installed in the bromine salt transfer pipe 310, for pressurizing bromine salt to be injected into the ballast pipe 100, and the ozone processor 2000 includes an ozone injection device 200 for supplying ozone to the ballast pipe 100; a mixer 220, which is installed in the ballast pipe 100, for mixing ozone supplied from the ozone injection device 200 and seawater transferred into the ballast pipe 100; and an ozone transfer pipe 210, which is connected to the mixer 220 of the ballast pipe 100, for injecting ozone supplied from the ozone injection device 200 into the ballast pipe 100. In addition, the ballast water treatment apparatus may further include a bromine-ozone mixing device 230 for mixing bromine salt and ozone supplied from the bromine salt injection part 3000 and the ozone processor 2000. A bromine salt and ozone are introduced into the bromine-ozone mixing device 230 and the mixture mixed in the bromine-ozone mixing device 230 is transferred into the mixer 220, whereby the mixture of bromine salt and ozone may be directly injected into the ballast pipe 100.

Example 5: Bromine Salt Injection Location
(Side-Stream Pipe—in Front of Side-Stream Pump)

Figure 5:
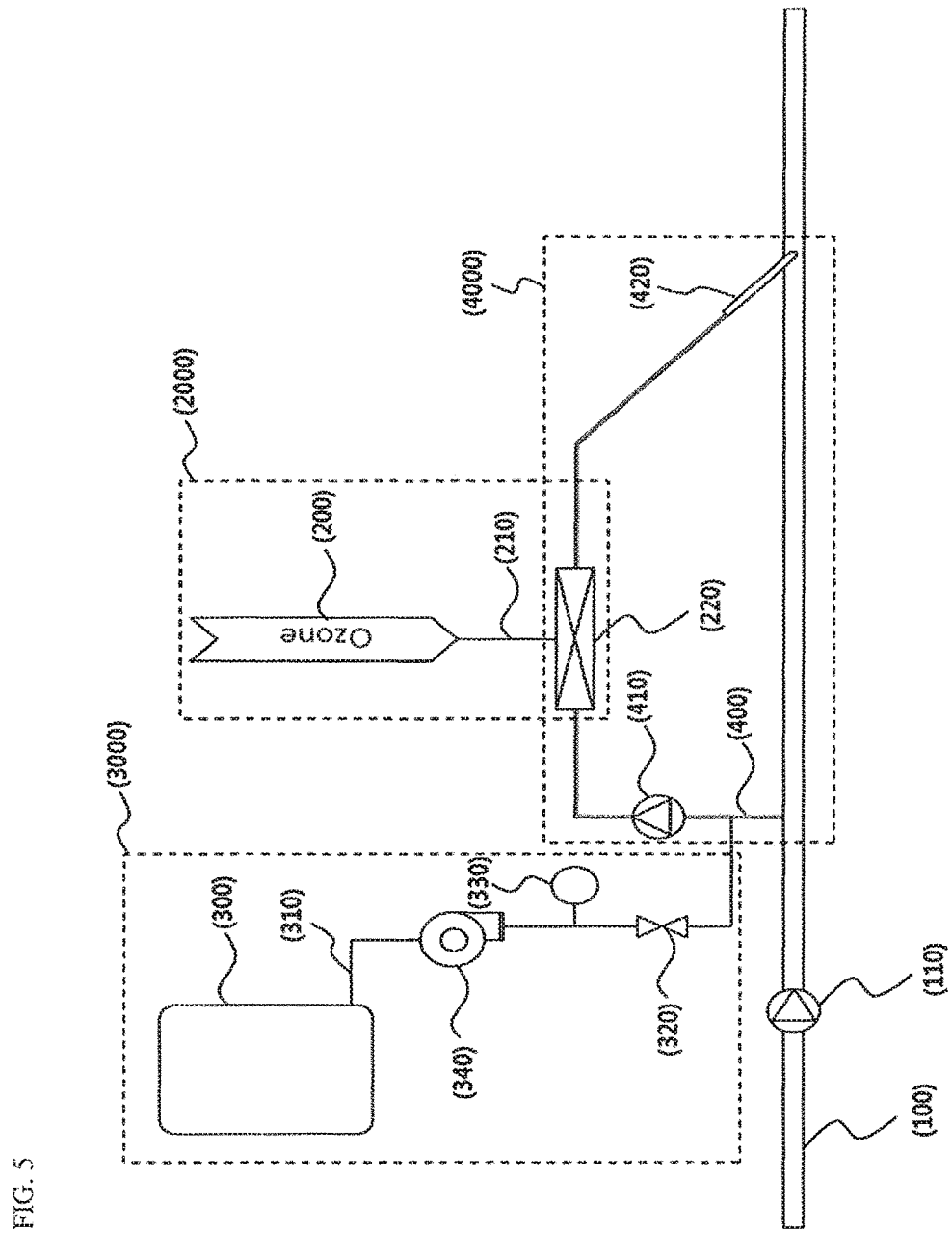
FIG. 5 is a block diagram illustrating a ballast water treatment apparatus equipped with devices for injecting bromine salt and ozone according to yet another embodiment of the present invention.

Referring to FIG. 5, the ballast water treatment apparatus equipped with devices for injecting bromine salt and ozone according to the present invention includes a ballast pipe 100 into which seawater flows; a ballast pump 110 for transferring seawater into the ballast pipe 100; a side-stream portion 4000; bromine salt injection part 3000; and an ozone processor 2000, wherein the side-stream portion 4000 includes a side-stream pipe 400, which is branched from the ballast pipe 100, for bypassing a portion of seawater introduced from the ballast pipe 100; a side-stream pump 410, which is installed in the side-stream pipe 400, for transferring a portion of seawater bypassed from the ballast pipe 100 into the side-stream pipe 400; and an injector 420 for injecting the bypassed seawater back into the ballast pipe 100, the bromine salt injection part 3000 includes bromine salt storage tank 300 for storing bromine salt; bromine salt transfer pipe 310, which is connected to the side-stream pipe 400, for injecting bromine salt supplied from the bromine salt storage tank 300 into the side-stream pipe 400; a control valve 320, which is installed in the bromine salt transfer pipe 310, for controlling the amount of bromine salt to be injected; a flow meter 330, which is installed in the bromine salt transfer pipe 310, for measuring the amount of bromine salt to be injected; and bromine salt injection pump 340, which is installed in the bromine salt transfer pipe 310, for pressurizing bromine salt to be injected into the side-stream pipe 400, and the ozone processor 2000 includes an ozone injection device 200 for supplying ozone to the side-stream pipe 400; a mixer 220, which is installed in the side-stream pipe 400, for mixing ozone supplied from the ozone injection device 200 and seawater transferred into the side-stream pipe 400; and an ozone transfer pipe 210, which is connected to the mixer 220 of the side-stream pipe 400, for injecting ozone supplied from the ozone injection device 200 into the side-stream pipe 400. The bromine salt transfer pipe 310 is connected to the front region of the side-stream pipe 400 with respect to the side-stream pump 410, and is configured to directly inject bromine salt into the side-stream pipe 400. The ozone processor 2000 is connected to the mixer 220 installed in the side-stream pipe 400 and is configured to inject ozone into the mixer 220.

Example 6: Bromine Salt Injection Location (Side-Stream Pipe—Between Side-Stream Pump and Mixer)

Figure 6:
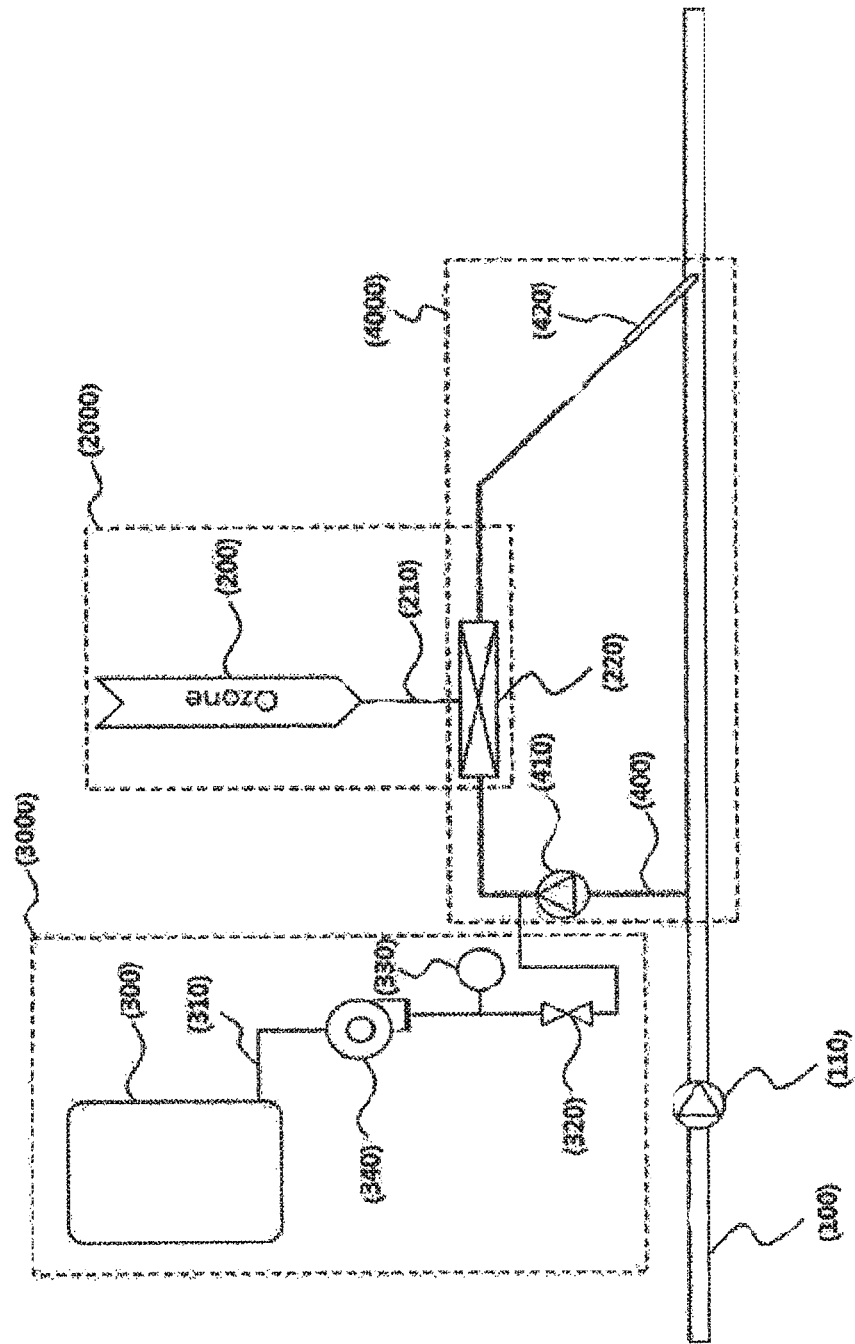
FIG. 6 is a block diagram illustrating a ballast water treatment apparatus equipped with devices for injecting bromine salt and ozone according to yet another embodiment of the present invention.

Referring to FIG. 6, the ballast water treatment apparatus equipped with devices for injecting bromine salt and ozone according to the present invention includes a ballast pipe 100 into which seawater flows; a ballast pump 110 for transferring seawater into the ballast pipe 100; a side-stream portion 4000; bromine salt injection part 3000; and an ozone processor 2000, wherein the side-stream portion 4000 includes a side-stream pipe 400, which is branched from the ballast pipe 100, for bypassing a portion of seawater introduced from the ballast pipe 100; a side-stream pump 410, which is installed in the side-stream pipe 400, for transferring a portion of seawater bypassed from the ballast pipe 100 into the side-stream pipe 400; and an injector 420 for injecting the bypassed seawater back into the ballast pipe 100, the bromine salt injection part 3000 includes bromine salt storage tank 300 for storing bromine salt; bromine salt transfer pipe 310, which is connected to the side-stream pipe 400, for injecting bromine salt supplied from the bromine salt storage tank 300 into the side-stream pipe 400; a control valve 320, which is installed in the bromine salt transfer pipe 310, for controlling the amount of bromine salt to be injected; a flow meter 330, which is installed in the bromine salt transfer pipe 310, for measuring the amount of bromine salt to be injected; and bromine salt injection pump 340, which is installed in the bromine salt transfer pipe 310, for pressurizing bromine salt to be injected into the side-stream pipe 400, and the ozone processor 2000 includes an ozone injection device 200 for supplying ozone to the side-stream pipe 400; a mixer 220, which is installed in the side-stream pipe 400, for mixing ozone supplied from the ozone injection device 200 and seawater transferred into the side-stream pipe 400; and an ozone transfer pipe 210, which is connected to the mixer 220 of the side-stream pipe 400, for injecting ozone supplied from the ozone injection device 200 into the side-stream pipe 400. The bromine salt transfer pipe 310 is connected to the side-stream pipe 400 between the side-stream pump 410 and the mixer 220, and is configured to directly inject bromine salt into the side-stream pipe 400. The ozone processor 2000 is connected to the mixer 220 installed in the side-stream pipe 400, and is configured to inject ozone into the mixer 220.

Example 7: Bromine Salt Injection Location (Side-Stream Pipe—Behind Mixer)

Figure 7:
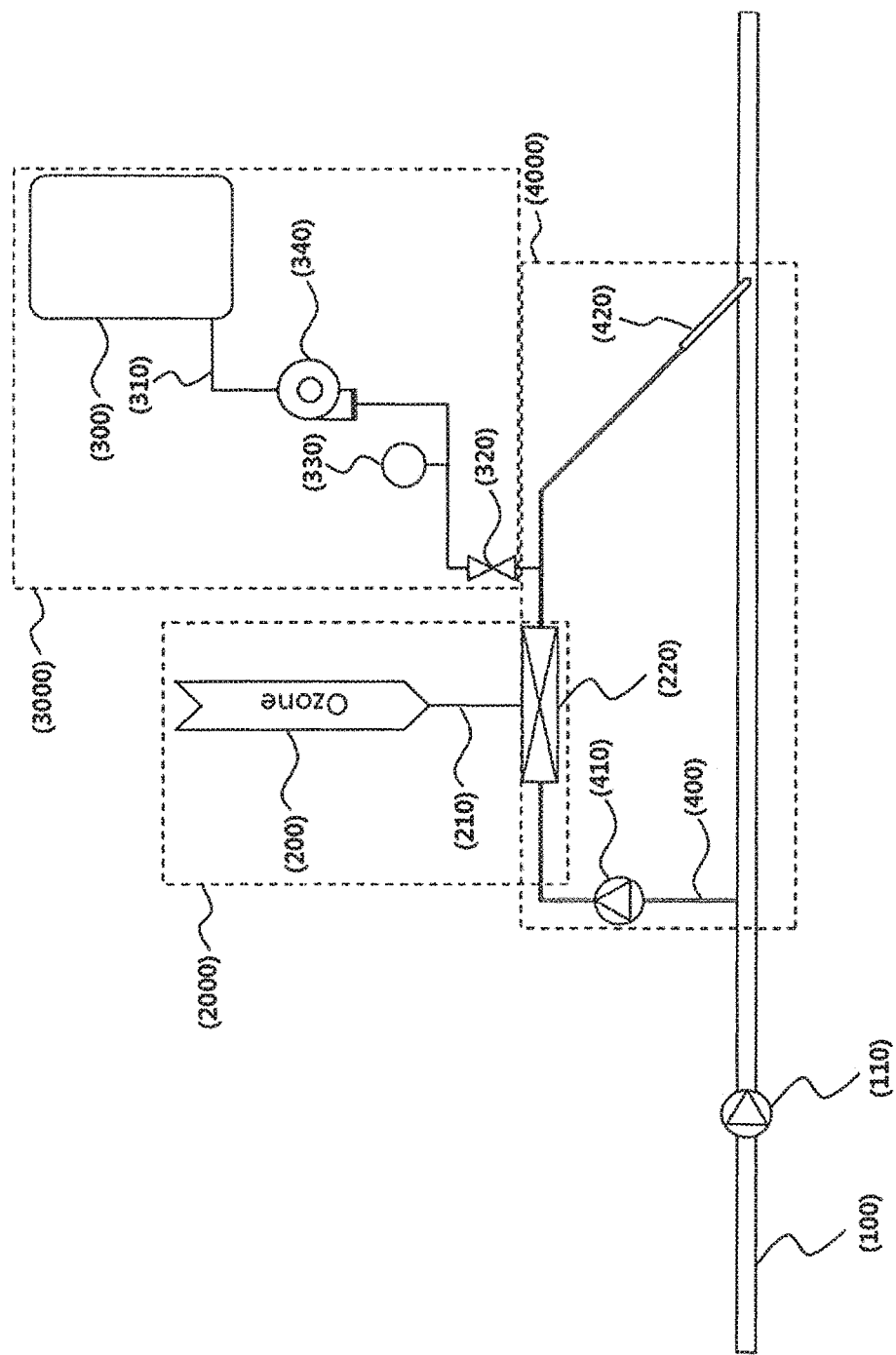
FIG. 7 is a block diagram illustrating a ballast water treatment apparatus equipped with devices for injecting bromine salt and ozone according to yet another embodiment of the present invention.

Referring to FIG. 7, the ballast water treatment apparatus equipped with devices for injecting bromine salt and ozone according to the present invention includes a ballast pipe 100 into which seawater flows; a ballast pump 110 for transferring seawater into the ballast pipe 100; a side-stream portion 4000; bromine salt injection part 3000; and an ozone processor 2000, wherein the side-stream portion 4000 includes a side-stream pipe 400, which is branched from the ballast pipe 100, for bypassing a portion of seawater introduced from the ballast pipe 100; a side-stream pump 410, which is installed in the side-stream pipe 400, for transferring a portion of seawater bypassed from the ballast pipe 100 into the side-stream pipe 400; and an injector 420 for injecting the bypassed seawater back into the ballast pipe 100, the bromine salt injection part 3000 includes bromine salt storage tank 300 for storing bromine salt; bromine salt transfer pipe 310, which is connected to the side-stream pipe 400, for injecting bromine salt supplied from the bromine salt storage tank 300 into the side-stream pipe 400; a control valve 320, which is installed in the bromine salt transfer pipe 310, for controlling the amount of bromine salt to be injected; a flow meter 330, which is installed in the bromine salt transfer pipe 310, for measuring the amount of bromine salt to be injected; and bromine salt injection pump 340, which is installed in the bromine salt transfer pipe 310, for pressurizing bromine salt to be injected into the side-stream pipe 400, and the ozone processor 2000 includes an ozone injection device 200 for supplying ozone to the side-stream pipe 400; a mixer 220, which is installed in the side-stream pipe 400, for mixing ozone supplied from the ozone injection device 200 and seawater transferred into the side-stream pipe 400; and an ozone transfer pipe 210, which is connected to the mixer 220 of the side-stream pipe 400, for injecting ozone supplied from the ozone injection device 200 into the side-stream pipe 400. The bromine salt transfer pipe 310 is connected to the rear region of the side-stream pipe 400 with respect to a region where the mixer 220 is installed, and is configured to directly inject bromine salt into the side-stream pipe 400. The ozone processor 2000 is connected to the mixer 220 installed in the side-stream pipe 400, and is configured to inject ozone into the mixer 220.

Bromine salt injection locations are presented in the above examples, and these injection locations should be determined according to conditions such as injection pressure and flow rate. For smooth diffusion of bromine salt, as shown in FIG. 1, a diffuser 350 may be installed at the injection port of the bromine salt transfer pipe 310.

In addition, the bromine salt storage tank 300 may be located above a point where the side-stream pipe 400 or the ballast pipe 100 is connected to the bromine salt transfer pipe 310 so that bromine salt is injected into the side-stream pipe 400 or the ballast pipe 100 by hydraulic pressure and thus the bromine salt injection pump 340 may be omitted.

The embodiments of the present invention have been described with reference to the drawings. Those of ordinary skill in the art may carry out a variety of applications and modifications based on the foregoing teachings within the scope of the present invention, and these modified embodiments may also be within the scope of the present invention.

The invention claimed is:

1. A ballast water treatment apparatus equipped with devices for injecting bromine salt and ozone, which is used to treat ballast water used in a ship, the ballast water treatment apparatus comprising:
    a ballast pipe (100) into which seawater flows;
    a ballast pump (110) for transferring seawater into the ballast pipe (100);
    a side-stream portion (4000);
    a bromine salt injection part (3000); and
    an ozone processor (2000),
    wherein the side-stream portion (4000) comprises:
    a side-stream pipe (400), which includes a first portion and a second portion and is branched from the ballast pipe (100), for bypassing a portion of seawater introduced from the ballast pipe (100);

a side-stream pump (410), which is installed in the side-stream pipe (400), for transferring the portion of seawater bypassed from the ballast pipe (100) into the side-stream pipe (400); and an injector (420) for injecting the bypassed seawater back into the ballast pipe (100), wherein the bromine salt injection part (3000) comprises:

a bromine salt storage tank (300) for storing bromine salt;

a bromine salt transfer pipe (310), which is connected to the bromine salt storage tank (300) and the first portion of the side-stream pipe (400), for injecting the bromine salt supplied from the bromine salt storage tank (300) into the first portion of the side-stream pipe (400); and a control valve (320), which is installed in the bromine salt transfer pipe (310), for controlling an amount of the bromine salt to be injected to the first portion of the side-stream pipe (400);

wherein the ozone processor (2000) comprises:

an ozone injection device (200) for supplying ozone to the side-stream pipe (400);

a mixer (220), which is installed in between the first portion of the side-stream pipe (400) and the second portion of the side-stream pipe (400), for mixing the ozone supplied from the ozone injection device (200), the bromine salt supplied into the side-stream pipe (400) from the bromine salt storage tank (300), and the portion of seawater bypassed from the ballast pipe (100); and an ozone transfer pipe (210), which is connected to the ozone injection device (200) and the mixer (220) and between the ozone injection device (200) and the mixer (220), for injecting the ozone supplied from the ozone injection device (200) into the mixer (220), and wherein the side-stream pump (410) is installed in the first portion of the side-stream pipe (400) and transfers the portion of seawater bypassed from the ballast pipe (100) and the bromine salt supplied from the bromine salt storage tank (300) to the mixer (220).

2. The ballast water treatment apparatus according to claim 1, wherein the bromine salt injection part (3000) is connected to the side-stream pipe (400) between a region where the side-stream pump (410) is installed and a region where the mixer (220) of the ozone processor (2000) is installed.

3. The ballast water treatment apparatus according to claim 1, wherein the bromine salt storage tank (300) is located above a point where the side-stream pipe (400) is connected to the bromine salt transfer pipe (310).

4. A ballast water treatment apparatus equipped with devices for injecting bromine salt and ozone, which is used to treat ballast water used in a ship, the ballast water treatment apparatus comprising:

a ballast pipe (100) into which seawater flows;

a ballast pump (110) for transferring seawater into the ballast pipe (100);

a side-stream portion (4000);

a bromine salt injection part (3000); and an ozone processor (2000), wherein the side-stream portion (4000) comprises:

a side-stream pipe (400), which includes a first portion and a second portion and is branched from the ballast pipe (100), for bypassing a portion of seawater introduced from the ballast pipe (100);

a side-stream pump (410), which is installed in the first portion of the side-stream pipe (400), for transferring the portion of seawater bypassed from the ballast pipe (100) into the side-stream pipe (400); and an injector (420) for injecting the bypassed seawater back into the ballast pipe (100), wherein the bromine salt injection part (3000) is connected to the second portion of the side-stream pipe (400), wherein the bromine salt injection part (3000) comprises:

a bromine salt storage tank (300) for storing bromine salt;

a bromine salt transfer pipe (310), which is connected to the bromine salt storage tank (300) and the second portion of the side-stream pipe (400), for injecting the bromine salt supplied from the bromine salt storage tank (300) into the second portion of the side-stream pipe (400); and a control valve (320), which is installed in the bromine salt transfer pipe (310), for controlling an amount of the bromine salt to be injected to the second portion of the side-stream pipe (400), wherein the ozone processor (2000) comprises:

an ozone injection device (200) for supplying ozone to the side-stream pipe (400);

a mixer (220), which is installed in between the first portion of the side-stream pipe (400) and the second portion of the side-stream pipe (400), for mixing the ozone supplied from the ozone injection device (200) and the portion of the seawater bypassed from the ballast pipe (100) into the side-stream pipe (400); and an ozone transfer pipe (210), which is connected to the ozone injection device (200) and the mixer (220) and between the ozone injection device (200) and the mixer (220), for injecting the ozone supplied from the ozone injection device (200) into the mixer (220), wherein the bromine salt transfer pipe (310) is connected to the side-stream pipe (400) at a portion of the side-stream pipe (400) between the mixer (220) and the injector (420).

* * * * *